June 10, 1924.

E. W. BRANDT

LIFTING TRUCK

Filed Feb. 15, 1921

Inventor:
Edgar William Brandt
By Lawrence Langner
Attorney

June 10, 1924.  
E. W. BRANDT  
LIFTING TRUCK  
Filed Feb. 15, 1921

Inventor:  
Edgar William Brandt  
By Lawrence Langner  
Attorney

Patented June 10, 1924.

1,497,085

UNITED STATES PATENT OFFICE.

EDGAR WILLIAM BRANDT, OF PARIS, FRANCE.

LIFTING TRUCK.

Application filed February 15, 1921. Serial No. 445,102.

*To all whom it may concern:*

Be it known that I, EDGAR WILLIAM BRANDT, citizen of the French Republic, residing at Paris, in the Republic of France, have invented new and useful Improvements in Lifting Trucks, of which the following is a specification.

This invention relates to a rolling truck comprising a suitable frame, a vertically movable horizontal platform supporting the load and a lifting device which may be operated by hand, by means of two steel bands or cables wound upon a single drum carried by the truck and lifting at the same time both lateral sides of the platform.

In the accompanying drawing and by way of example:

Fig. 1 represents in elevation a truck according to the invention, the platform being lifted.

Fig. 1$^a$ is a partial vertical section view of the frame along line 1$^a$—1$^a$ of Fig. 1.

Fig. 3 shows a front view of the upright part of the frame.

Fig. 6 is a side view of the mechanism, with the casing in section.

Figure 1:
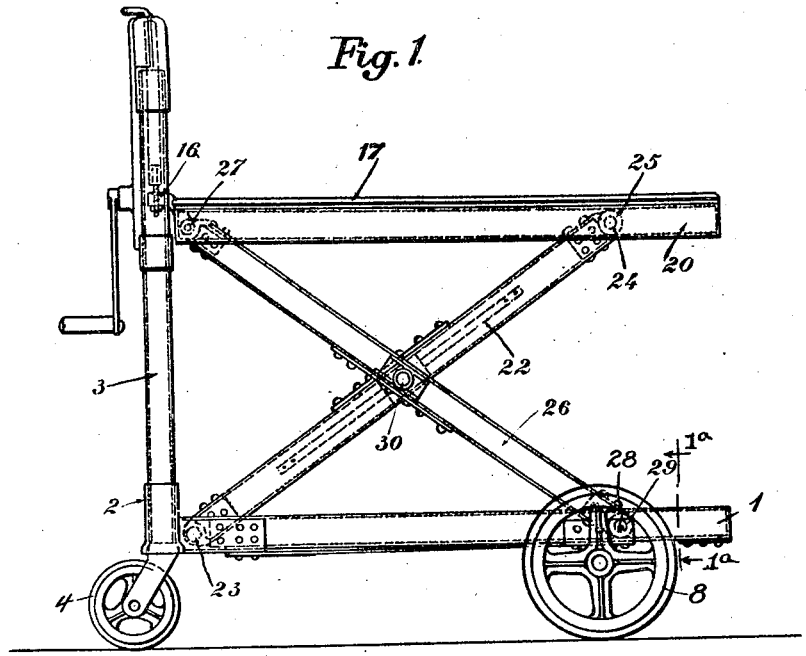

Fig. 6$^a$ shows a horizontal section view along line 6$^a$—6$^a$ of Fig. 6.

Fig. 7 is a vertical section of the driving mechanism.

Fig. 8 indicates the coupling of the lifting band to the platform.

As shown in the drawings, the truck according to the invention comprises three parts, the frame with its upright part, the platform with its articulated system, and the lifting mechanism.

*a.—Frame.*

This is composed of a framework 1 of sheet metal with channel bar section, one end whereof is a piece of cast steel 2 wherein are inserted the uprights 3 of the vertical portion, the two steering wheels 4 and the articulations 5 of the inner cross members.

Upon the frame which is cross-braced by the flat bar iron member 6 is secured the axle 7 in cast steel which carries two wheels 8 secured thereto.

The wheels are of malleable iron, with or without rubber tyres; they afford a great steadiness for the truck. However, according to requirements, only three wheels may be used, and in this case the steering wheel is secured to the middle of the cross member 2.

The uprights of the vertical portion are constituted by two tubes 3 (Figs. 1 and 3) of drawn steel, secured in the cross member 2, and in the casing 15 of the lifting mechanism.

These tubes are split throughout their entire free height, to permit the passage of the cross piece 16 used for lifting the platform 17, for which they act as guide members.

A panel 18 of wood strengthened by a cross-shaped member of half-round iron bar 19 fills the space between these uprights, the casing and the frame.

This panel may be made of sheet metal.

*b.—Platform and its cross pieces.*

Figure 2:
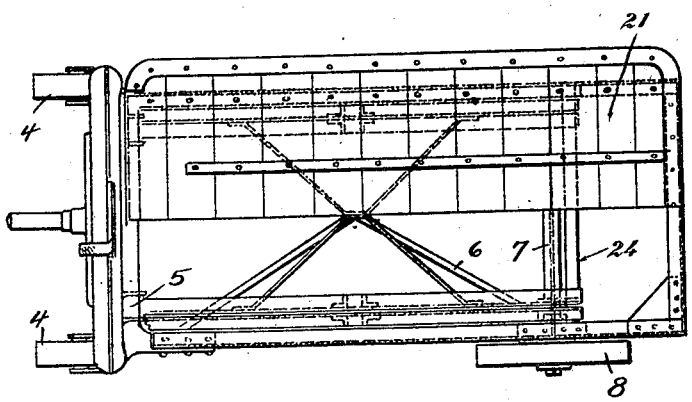
Fig. 2 represents the same truck in plan view, one half of the platform being removed to show the cross-pieces.
Figure 1A:
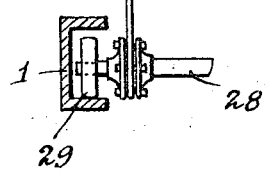

The movable platform 17 (Figs. 1 and 2), is constituted by a frame 20 of sheet metal having a channel bar section, whereof one of the short sides is formed of a piece of cast steel 16 serving to secure the bands or cables and receiving the articulations of the outer cross-pieces. To this frame are bolted the boards 21 of very strong wood suitably reinforced. These boards may be replaced by a pressed and perforated sheet metal piece.

The cross-pieces which are made of steel sheets comprise:

1. Two inner cross-pieces 22 braced by a cross-shaped member of flat bar iron. The lower end of the arms is articulated to the frame of the truck upon the piece 2 at 23, and their upper end is traversed by a cross-connecting tube 24 carrying the rollers 25 rolling within the frame of the movable platform.

2. Two outer cross-pieces 26, whereof one end is articulated to the piece 16 of the frame of the movable platform at 27, the other end being secured to a cross connecting tube 28 carrying the rollers 29 rolling in the longitudinals of the frame of the truck.

The connection between these two groups of cross-pieces, in order to constitute the articulated system, is effected by the two common axle pins 30 extending through the cross pieces at the middle thereof.

The whole device constitutes a very strong support providing a perfect steadiness for the platform, and maintaining it always in a horizontal plane.

c.—Lifting mechanism.

The mechanism is entirely contained in an aluminum casing in two parts carrying the bosses required for securing the parts.

The principal part 31 is secured to the uprights 3 by the simple pressure of the bolts 32, and its shape permits the driver to have a suitable hand grasp upon the uprights at 33. The other part of the casing forming a cover is connected with the part 31 by bolts 35 with head lying below the surface which permit a rapid dismounting.

The lifting of the platform is obtained by the winding upon a single drum 36 of two steel bands 37 of great strength, one end whereof is secured to this drum, and the other end carries a coupling member 38 engaging in the cast steel piece 16 of the platform. The pulleys 39 maintain them in the axis of the uprights. Their dismounting is very easy as well as the adjustment of their length.

The use of these steel bands, which are very flexible, permits to obtain the maximum safety with the minimum weight, reducing in a very special manner the size of the winding drum which may have a small diameter.

The steel bands may be replaced by very flexible round cables of steel.

The winding drum 36 which is suitably constructed to hold the coupling ends of the bands, is riveted to a gear wheel 41 loosely revoluble on a hollow shaft serving as a grease-holder.

The control of this gear wheel is obtained by a pinion 42 (Fig. 7) secured to a disc 43, the whole forming a nut upon a quick-motion screw 44 having also a disc 45, and secured to the operating crank 46. A ratchet wheel 47 rotates loosely on the disc 45 between this disc and that of the pinion 42. Its sense of rotation can only be that of the hands of a watch which will be called positive sense, by reason of the pawl 48.

When the crank is at rest, the load tends to turn the wheel 41 in a positive sense and thus the pinion 42 in a negative sense. But the thread of the screw 44 being left handed, the pinion 42 is displaced towards the left and applies the discs upon the ratchet wheel with a sufficient force to provide connection between these three elements by friction. The ratchet wheel is thus caused to rotate in a negative direction but said rotation is prevented by reason of the pawl 48, and the whole system is blocked.

For lifting the load, the crank is turned in the positive sense and in this movement, the disc 43 is applied by the pinion 42 on the ratchet wheel, with a greater force still, and drives the latter in a positive sense, like the pinion 42, and the winding of the steel bands upon the drum is effected.

To lower the platform, the crank is turned in the negative sense, which has the effect of displacing the pinion 42 to the right, thus reducing the friction of the disc of the pinion upon the ratchet-wheel, and thus permitting the rotation of the pinion in the sense suitable to the descent. But upon ceasing the movement of the crank the blocking is instantly carried out as it has been seen hereinbefore, which affords a great safety in working.

The discs may be conical, as in the cone clutch, and the principle of operating remains the same.

Figure 4:
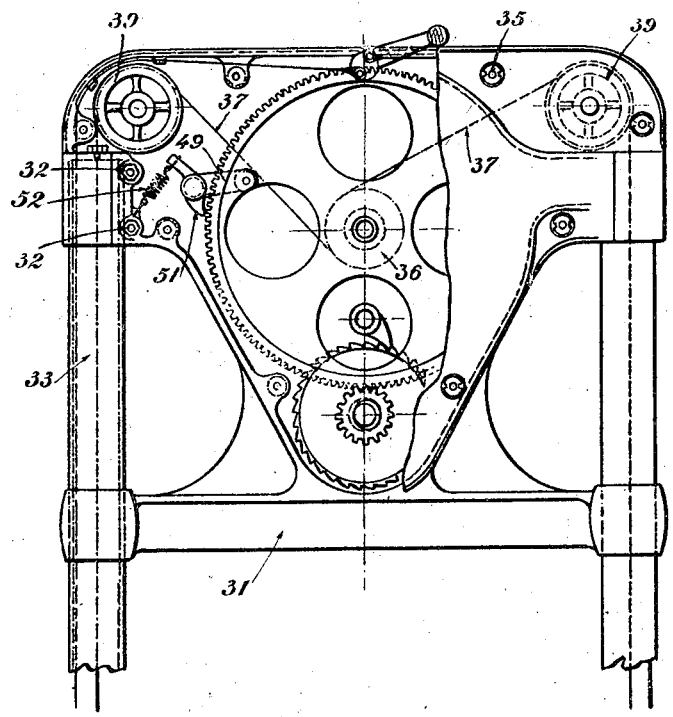
Fig. 4 shows the whole lifting mechanism, with part of the casing removed.
Figure 5:
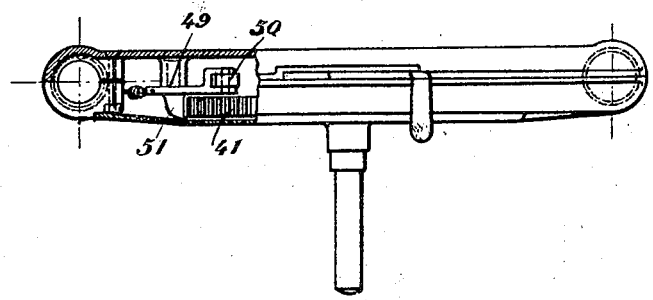
Fig. 5 shows a plan of this mechanism, with part of the casing removed.

A device prevents any further rotation of the crank for lowering the platform, as soon as the latter arrives at the bottom of its course; it is constituted (see Figs. 4 and 5) by a lever 49 articulated to the casing 31, carrying a roller 50 in contact with one of the steel bands. This lever has a portion 51 adapted to engage in the space between the teeth of the gear wheel 41 and another portion secured to a spiral spring 52 connected with the casing.

Normally, the band exerts its action upon the lever by disengaging it from the gear wheel, which does not hinder the movement, but as soon as the band becomes slack which will occur on continuing to turn the crank, the platform being at the bottom of its course, the spring 52 will cause the part 51 of the lever to engage the gear wheel which can no longer turn.

This will obviate the unwinding of the bands from their drum, which would be prejudicial to good working.

Having now described my invention, what I claim as new and desire to secure by Letters Patent is:

1. A rolling truck for the transportation and lifting of loads comprising a frame carrying wheels, a vertical part with two uprights secured at one end of said frame, a horizontal platform movable vertically, means for guiding one end of the platform along said uprights, inner cross pieces pivoted at one end about axles secured to said frame, outer cross pieces pivoted at one end about axles secured to said platform, the other end of said inner and outer cross pieces bearing on the platform and on the frame respectively by the intermediary of rollers, each outer cross piece being articulated with the adjacent inner cross piece at their middle part and means for lifting said platform by both sides at the same time substantially over the whole height of said vertical part with a lifting effort keeping a constant value during the whole lifting of said platform.

2. A rolling truck for the transportation and lifting of loads comprising a frame, wheels carried by said frame, an upright part constituted by two vertical side tubes spilt throughout their entire free height, cast steel boxes secured at one end of the frame and in which said side tubes are inserted, a rigid vertical panel connecting said tubes, a horizontal platform movable vertically, coupling side pieces secured to one end of the platform and adapted to slide inside the slits in said vertical tubes, articulated means pivoted at one end of the platform and of the frame for supporting the opposite end of the platform and means secured to said upright part and connected to said coupling pieces for lifting the platform by both sides at the same time substantially over the whole height of said upright part.

3. A rolling truck for the transportation and lifting of loads comprising a frame, wheels carried by said frame, an upright part constituted by two vertical side tubes split throughout their entire free height, cast steel boxes secured at one end of the frame and in which said side tubes are inserted, a rigid vertical panel connecting said tubes, a horizontal platform movable vertically, coupling side pieces secured to one end of the platform and adapted to slide inside the slits in said vertical tubes, articulated means pivoted at one end of the platform and of the frame for supporting the other end of the platform, a casing secured on the upper end of said upright part, a drum rotatably mounted in said casing, two steel bands adapted to slide inside said vertical tubes and secured at one end to said drum, and secured at the other end to said coupling pieces and means for actuating said drum for lifting and for lowering said platform substantially over the whole height of said upright part.

4. A rolling truck for the transportation and lifting of the loads comprising a frame, wheels carried by said frame, an upright part constituted by two vertical side tubes split throughout their entire free height, cast steel boxes secured at one end of the frame and in which said side tubes are inserted, a rigid vertical panel connecting said tubes, a horizontal platform movable vertically, coupling side pieces secured to one end of the platform and adapted to slide inside the slits in said vertical tubes, articulated means pivoted at one end of the platform and of the frame for supporting the other end of the platform, a casing secured on the upper end of said upright part, a drum rotatably mounted in said casing, two steel bands adapted to slide inside said vertical tubes and secured at one end to said drum, and secured at the other end to said coupling pieces, pulleys over which said bands are trained and guided inside said tubes, a gear wheel coaxial with said drum and secured to the latter, a quick motion screw rotatably mounted in said casing, an actuating crank secured on said screw, a pinion mounted on said screw and engaging with said gear wheel, a ratchet wheel coaxial with said pinion and screw, a pawl engaging with said ratchet wheel and discs disposed on each side of said ratchet wheel and adapted to be applied upon the same by the weight of the load supported by the platform.

5. A rolling truck for the transportation and lifting of loads, comprising a frame, wheels carried by said frame, an upright part secured at one end of said frame, a horizontal platform movable vertically, a casing secured on the upper end of said upright part, means for lifting and lowering said platform, said means including a drum rotatably mounted in said casing and steel bands secured at one end to said drum, and secured at the other end to the platform, a gear wheel coaxial with said drum and secured to the latter, hand operated means for rotating said drum, and means actuated by said steel bands for preventing further rotation of said drum when said platform has reached the bottom of its course, when lowering.

6. A rolling truck for the transportation and lifting of loads, comprising a frame, wheels carried by said frame, an upright part secured at one end of said frame, a horizontal platform movable vertically, a casing secured on the upper end of said upright part, means for lifting and lowering said platform, said means including a drum rotatably mounted in said casing and steel bands secured at one end to said drum, and secured at the other end to the platform, a gear wheel coaxial with said drum and secured to the latter, hand operated means for rotating said drum, a lever pivotally mounted in said casing and one end of which is adapted to contact with one of said steel bands, the other end of said lever being spring controlled and may engage in the space between the teeth of said gear wheel when said steel band becomes slack.

In testimony whereof I have signed my name to this specification.

EDGAR WILLIAM BRANDT.